June 23, 1959 F. K. BAUER ET AL 2,891,373
MACHINE FOR GATHERING DOWN EARS OF CORN
Filed Sept. 2, 1955 3 Sheets-Sheet 2

Inventors
F. K. Bauer &
R. D. Tufford
by M. Talbert Dick
Attorney

Witness
Edward P. Seeley

June 23, 1959 F. K. BAUER ET AL 2,891,373
MACHINE FOR GATHERING DOWN EARS OF CORN
Filed Sept. 2, 1955 3 Sheets-Sheet 3
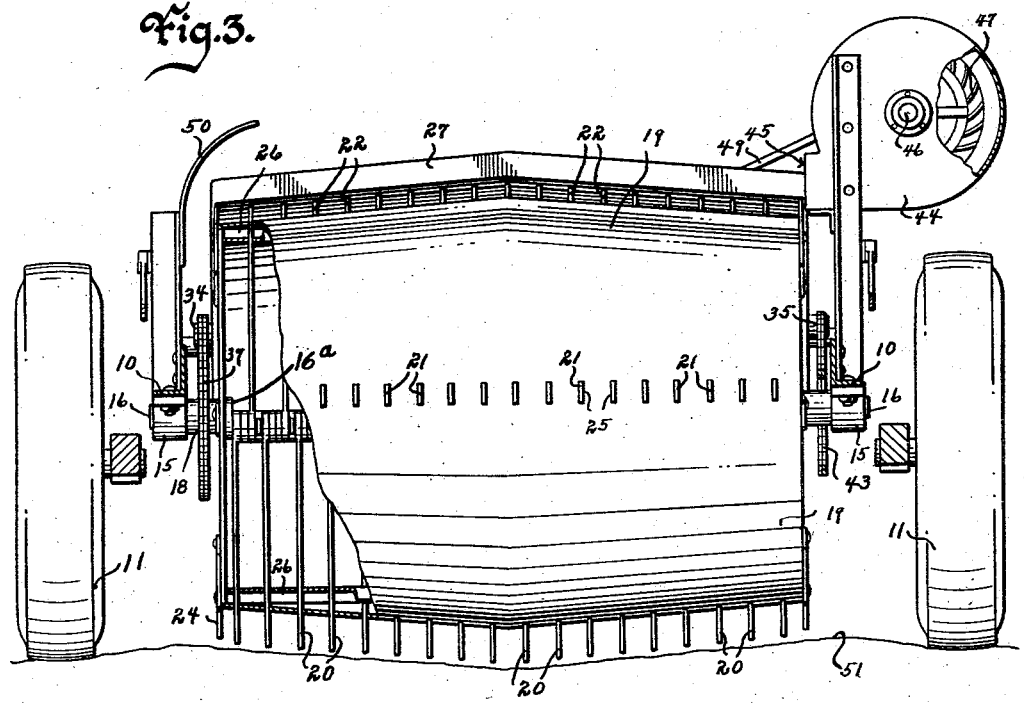
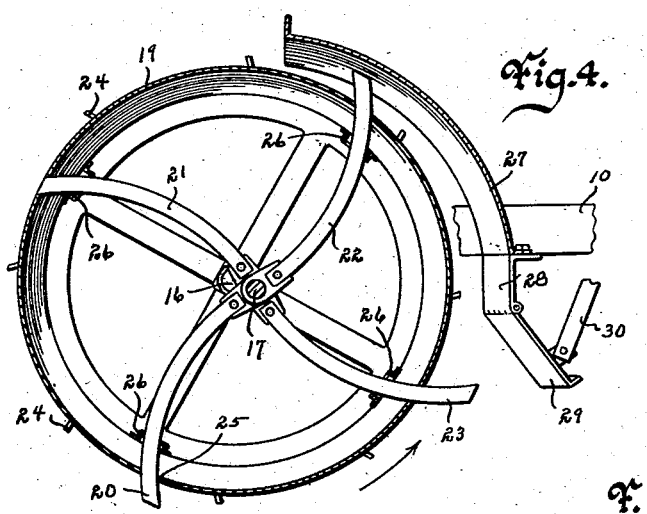
Inventors
F. K. Bauer &
R. D. Tufford
by M. Talbert Dick
Attorney
Witness
Edward P. Seeley United States Patent Office 2,891,373
Patented June 23, 1959

2,891,373

MACHINE FOR GATHERING DOWN EARS OF CORN

Frank K. Bauer, Newton, Iowa, and Robert D. Tufford, Minneapolis, Minn., assignors to Helen W. Bauer, Newton, Iowa Application September 2, 1955, Serial No. 532,152

10 Claims. (Cl. 56—345)

This invention relates to agriculture implements and more particularly to a machine that will pick up grounded ears of corn not harvested by the mechanical corn picker.

Corn is one of the most important crops grown in this country. Until relatively recent times the ears of corn were all hand harvested and this included not only the ears on the stalks but the ears that had fallen onto the ground. Then came the advent of the mechanical powered corn picker. These pickers only harvest the ears that are on standing stalks. Furthermore such machines and their pulling means, by this very nature, knock many ears loose and to the ground. The result is that many bushels of corn per acre are lost. Approximately fifty million acres of corn are planted annually in the United States and therefore the corn loss by down ears is terrific. The loss in the State of Iowa alone is estimated at seventy-five million bushels. Not only are the down ears lost, but their seeding of the field the next year is highly objectionable and entails time, labor and costs to clear the field of such objectionable growth. One obvious possible solution would be to manually pick the down ears after the mechanical picker had harvested the field. From a practical standpoint this is impossible. First, one would have to stoop over, reach to the ground level, and then straighten up, for each ear obtained. No one could endure such exertion for long. Secondly, there is no labor obtainable for this work.

Therefore one of the principal objects of our invention is to provide a machine that will retrieve grounded ears of corn.

A further object of this invention is to provide a mechanized implement for picking up ears of corn from the ground that cleans the same of certain foreign matter, and deposits the corn into a wagon, truck or like box.

A still further object of our invention is to provide a down ear of corn gleaning device that conforms to the ground surface variation between the rows of corn.

A still further object of this invention is to provide a machine for gathering loose ears of corn that is easily operated and rapid.

A still further object is to provide an ear corn gleaner that operates to comb through the corn stalks and retrieve the lost ears of corn.

Still further objects of our invention are to provide a machine for gleaning ears of corn left in a field after the use of a mechanical picker, that is economical in manufacture, durable in use, and refined in appearance.

These and other objects will be apparent to those skilled in the art.

Our invention consists in the construction, arrangements, and combination, of the various parts of the device, whereby the objects contemplated are attained as hereinafter more fully set forth, specifically pointed out in our claims, and illustrated in the accompanying drawings, in which:

Fig. 3 is a back view of our gleaner taken on line 3—3 of Fig. 2 and with sections cut away to more fully illustrate its construction.

Fig. 4 is a longitudinal sectional view taken on line 4—4 of Fig. 1.

Figure 2:
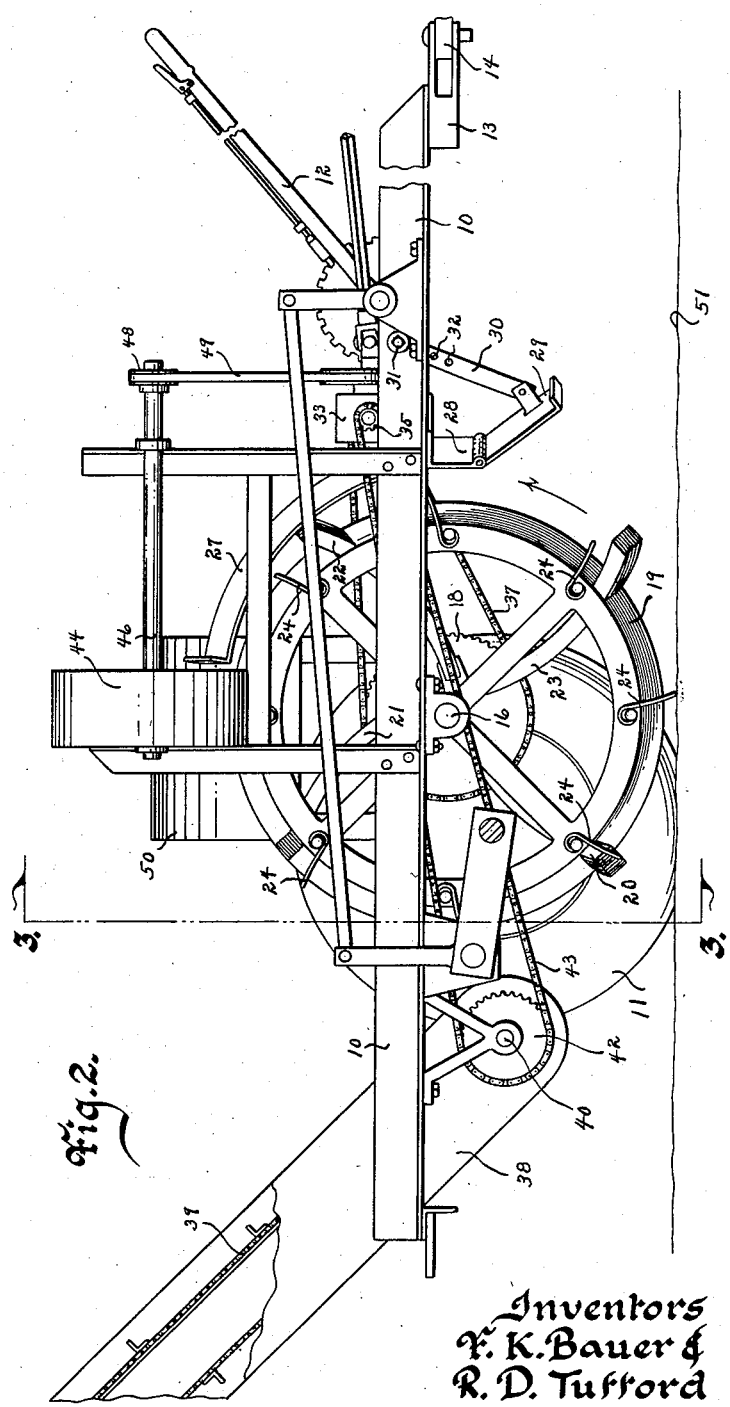
Fig. 2 is a side view of the machine taken from line 2—2 of Fig. 1.

In these drawings we have used the numeral 10 to designate the chassis frame of the machine. The frame 10 is vertically adjustably supported by wheels 11. The vertical adjustment is controlled by the usual lever 12 as shown in Fig. 2. The method of wheel supporting the frame is not important and standard practices are utilized. However the unit must be drawn over the field to be processed and the tongue 13 is adapted to be attached to the draw bar 14 of a prime mover such as a tractor, truck or like. On each side of the frame 10 is a bearing member 15, supporting a fixed stub crank shaft 16 as shown in Fig. 3. The numeral 17 designates a horizontal shaft connecting the two inner ends of the two stub crank shafts 16, respectively. This shaft 17 extends between the two stub crank shafts 16 and is transversely of the path of travel of the device. The numeral 18 designates a sprocket gear rotatably secured around one of the stub crank shafts 16. The two stub crank shafts also rotatably support between them a horizontal drum 19, embracing the shaft 17, extending between the sides of the frame 10, concentric with the bearing members 15, and outer end portions of the shaft 16, and fixed to the sprocket gear 18. By this arrangement of parts when the sprocket gear 18 is rotated the drum will rotate, but the stub crank shaft 16 and connecting shaft 17 will remain stationary. The two stub crank shafts 16 have their inner end portions 16a extending forwardly and downwardly and therefore the shaft 17 is eccentric with the longitudinal center plane of the drum. This drum 19 has a larger diameter at its center than at its two ends as shown in Fig. 3, the purpose of which will be later explained. Rotatably mounted on the shaft 17 are a plurality of spaced apart finger units. Each unit has four evenly spaced apart fingers or bars 20, 21, 22, and 23. Each finger when it is extending downwardly is curved to extend downwardly and forwardly in a curved path as shown in Fig. 4. The length of the fingers are such as to slidably penetrate through slits 25 in the drum 19. Also each of the fingers slidably extend through guide means 26 secured internally within the drum. Therefore the finger units all rotate with the drum, but due to the eccentrically mounted shaft 17 the individual fingers will slidably protrude beyond the periphery of the drum as they extend forwardly and downwardly. Obviously when the fingers move to extend upwardly and rearwardly, they will slidably withdraw into the drum as shown in Fig. 4. The lengths of the fingers increase as the finger units progress toward the center of the drum thereby conforming to the shape of the drum as shown in Figure 3. The numeral 27 designates a shield on the chassis, having its width curved and spaced apart from the drum 19. The lengths of the fingers increase as the finger units progress toward the center of the drum thereby conforming to the shape of the drum as shown in Fig. 3. The number 27 designates a shield on the chassis, having its width curved and spaced apart from the upward forward side of the drum and finger units as shown in Fig. 4. The numeral 28 designates a baffle plate on the under side of the frame 10, extending downwardly and directly forward of the drum. The number 29 designates a baffle plate having its top hingedly secured to the bottom of the fixed plate 28. The numeral 30 designates a bar having its lower end pivoted to the lower end portion of the baffle plate 29, and its upper end portion adjustably attached to the frame 10 by a bolt 31 extending through the frame and selectively through holes 32 in the bar 30. By this arrangement the baffle plate 29 may be adjusted closer or further away from the lower forward side of the drum. On the outer side of each side of the drum we have provided a plurality of radially extending spring fingers 24, for yieldingly engaging any ears of corn near the sides of the drum combing through the stalks and guiding the ears of corn inwardly where they will be engaged and carried by the fingers 20, 21, 22, and 23.

Figure 1:
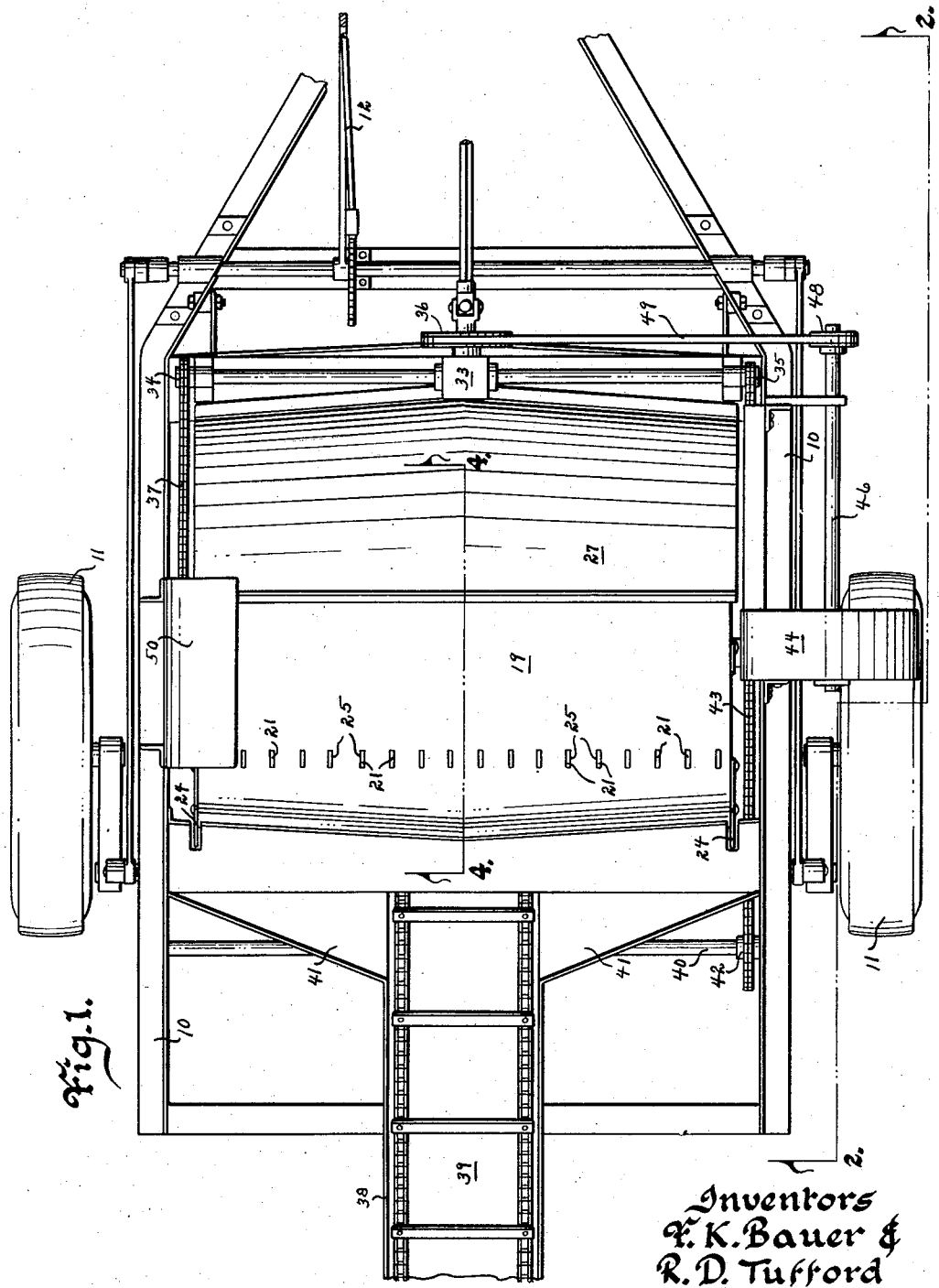
Fig. 1 is a top plan view of our device ready for use.

The numeral 33 designates a standard gear box and gears operatively connected to the sprocket gear 34, and the sprocket gear 35 and the pulley wheel 36. This power transmission 33 is located near the front end of the device and is adaptable to be operatively connected to the usual power take-off means of the pulling tractor or like. The numeral 37 designates an endless chain embracing the sprocket wheel 18 and the sprocket wheel 34. The numeral 38 designates any suitable conveyor extending upwardly and rearwardly at the rear end of the machine. In the drawings we show this conveyor as the endless belt type having the belt 39, the lower belt shaft 40, and the hopper 41. This hopper 41 is located in the rear of the drum as shown in Fig. 1. The numeral 42 designates a sprocket gear on the shaft 40. The numeral 43 designates an endless chain embracing the sprocket gear 35 and a sprocket gear 42. The numeral 44 designates an air fan housing located on the chassis frame and having its discharge 45 directed to pass air over the drum as shown in Fig. 3. This fan housing has the usual shaft 46 and fan blades 47. The numeral 48 designates a pulley wheel on the shaft 46. The numeral 49 designates an endless belt embracing the pulley wheel 36, and pulley wheel 48. The numeral 50 designates a curved air and material baffle on the chassis frame, positioned on the side opposite of the fan housing, and extending in spaced relationship over a portion of the top of the drum as shown in Fig. 3. The numeral 51 designates the ground level or surface over which the machine operates. The practical operation of the machine is as follows: With the prime mover rotating the sprocket gear 34, the sprocket gear 35 and the pulley wheel 36, the drum 19 will be turned with its lower portion moving as shown by the arrow in Fig. 2. The fingers 20, 21, 22, and 23 will move with the drum and will slidably protrude from the drum as they approach the ground surface and the forward side of the drum. The portions of the fingers that extended beyond the periphery of the drum will act as rake teeth picking up ears from the ground as well as combing ears from down stocks. The retrieved ears of corn will be carried upwardly between the drum and the baffle members 27, 28, and 29. Upon reaching the top of the drum, the air fan will blow a stream of air over the top of the drum thereby blowing away undesirable foreign matter such as dirt, leaves, husks and like. After this cleaning operation the ears of corn will follow backwardly and downwardly on the drum and at which position the fingers will withdraw as shown in Fig. 4. The ears then fall into the hopper 41 which is closely adjacent the rear side of the drum and thence they are carried upwardly by the elevator 38 into a receiving wagon box or like. The spring fingers 24 are slightly curved to aid in throwing side ears into the paths of the fingers 20, 21, 22 and 23. These spring fingers also aid in holding ears of corn from falling from the drum. The fingers 20, 21, 22 and 23 are curved to extend forwardly and downwardly as they reach the ground surface in order to extend under, lift up, and carry the ears of corn around with the drum. The condition of the field of corn and the relative speed of the machine over the ground relative to the speed of rotation of the drum makes necessary the adjustment of the member 29 to compensate for the same. The distance between the fingers of any given row is such that no ears of corn can pass through them but corn stalks and other unwanted material can pass between them. Field conditions will require the machine to operate at different elevations above the ground surface and this adjustment is had by the lever 12 and its linkage with the supporting wheels 11.

From the foregoing it will be seen that our machine will successfully glean ears of corn not obtained by the mechanical corn picker that previously processed the field. Such lost ears of corn that have fallen due to weather, stock structure, corn borers and like, are easily and quickly gathered by our machine. The rows of fingers get longer as they progress from both directions toward the center length of the drum, and the drum progresses in greater diameter from both its ends in order to conform to the ground surface, which is depressed or concave between any two rows of corn.

Some changes may be made in the construction and arrangement of our machine for gathering down ears of corn without departing from the real spirit and purpose of our invention, and it is our intention to cover by our claims, any modified forms of structure or use of mechanical equivalents which may be reasonably included within their scope.

We claim:

1. In an ear corn gleaning machine, a chassis, wheels for supporting said chassis, a drum rotatably mounted on said chassis and arranged transversely of said chassis, a shaft eccentrically mounted longitudinally within said drum, and a plurality of rows of fingers rotatably mounted on said shaft and capable of having their outer end portions slidably extending through the periphery of said drum; said drum adapted to be rotated so that its lower segment moves in the direction of travel of said gleaning machine; said drum having an increasing diameter as it approaches its center from both ends.

2. In an ear corn gleaning machine, a chassis, wheels for supporting said chassis, a drum rotatably mounted on said chassis and arranged transversely of said chassis, a shaft eccentrically mounted longitudinally within said drum, said drum tapered inwardly from its midpoint towards its ends, and a plurality of fingers rotatably mounted on said shaft and capable of having their outer end portions slidably extending through the periphery of said drum; said drum adapted to be rotated by suitable means as the machine moves over the ground.

3. In an ear corn gleaning machine, a chassis, wheels for supporting said chassis, a drum rotatably mounted on said chassis and arranged transversely of said chassis, a shaft eccentrically mounted longitudinally within said drum, said drum tapered inwardly from its midpoint towards its ends, and a plurality of rows of fingers rotatably mounted on said shaft and capable of having their outer end portions slidably extending through the periphery of said drum; said drum adapted to be rotated by suitable means as it moves over the ground.

4. In an ear corn gleaning machine, a chassis, wheels for supporting said chassis, a drum rotatably mounted on said chassis and arranged transversely of said chassis, a shaft eccentrically mounted longitudinally within said drum, said drum tapered inwardly from its midpoint towards its ends, and a plurality of curved fingers rotatably mounted on said shaft and capable of having their outer end portions slidably extending through the periphery of said drum; said drum adapted to be rotated so that its lower segment moves in the direction of travel of said gleaning machine.

5. In an ear corn gleaning machine, a chassis, wheels for supporting said chassis, a drum rotatably mounted on said chassis and arranged transversely of said chassis, a shaft eccentrically mounted longitudinally within said drum, said drum tapered inwardly from its midpoint towards its ends, a plurality of fingers rotatably mounted on said shaft and capable of having their outer end portions slidably extending through the periphery of said drum; said drum adapted to be rotated so that its lower segment moves in the direction of travel of said gleaning machine and bearing means within said drum slidably embracing each of said fingers.

6. In an ear corn gleaning machine, a chassis, wheels for supporting said chassis, a drum rotatably mounted on said chassis and arranged transversely of said chassis, a shaft eccentrically mounted longitudinally within said drum, said drum tapered inwardly from its midpoint towards its ends, and a plurality of spaced apart fingers rotatably mounted on said shaft and capable of having their outer end portions slidably extending through the periphery of said drum; said drum adapted to be rotated so that its lower segment moves in the direction of travel of said gleaning machine.

7. In an ear corn gleaning machine, a chassis, wheels for supporting said chassis, a drum rotatably mounted on said chassis and arranged transversely of said chassis, a shaft eccentrically mounted longitudinally within said drum, said drum tapered inwardly from its midpoint towards its ends, a plurality of fingers rotatably mounted on said shaft and capable of having their outer end portions slidably extending through the periphery of said drum; said drum adapted to be rotated by suitable means and a receiving hopper on said chassis positioned adjacent the rear segment of said drum.

8. In an ear corn gleaning machine, a chassis, wheels for supporting said chassis, a drum rotatably mounted on said chassis and arranged transversely of said chassis, a shaft eccentrically mounted longitudinally within said drum, said drum tapered inwardly from its midpoint towards its ends, a plurality of fingers rotatably mounted on said shaft and capable of having their outer end portions slidably extending through the periphery of said drum; said drum adapted to be rotated so that its lower segment moves in the direction of travel of said gleaning machine, a receiving hopper on said chassis positioned adjacent the rear segment of said drum and an elevator means associated with said hopper.

9. In an ear corn gleaning machine, a chassis, wheels for supporting said chassis, a drum rotatably mounted on said chassis and arranged transversely of said chassis, a shaft eccentrically mounted longitudinally within said drum, and a plurality of fingers rotatably mounted on said shaft and capable of having their outer end portions slidably extending through the periphery of said drum; said drum adapted to be rotated so that its lower segment moves in the direction of travel of said gleaning machine; said drum having an increasing diameter as it approaches its center from both ends, said fingers located near the center length of the drum having lengths greater than the lengths of said fingers closer to the ends of said drum.

10. In an ear corn gleaning machine, a chassis, wheels for supporting said chassis, a drum rotatably mounted on said chassis and arranged transversely of said chassis, a shaft eccentrically mounted longitudinally within said drum, said drum tapered inwardly from its midpoint towards its ends and adapted to conform to the ground surface between two rows of corn, and a plurality of fingers rotatably mounted on said shaft and capable of having their outer end portions slidably extending through the periphery of said drum; said drum adapted to be rotated by suitable means as the machine moves over the ground.

References Cited in the file of this patent

UNITED STATES PATENTS

| | | |
|---|---|---|
| 986,198 | Morris | Mar. 7, 1911 |
| 1,531,521 | Smith | Mar. 31, 1925 |
| 1,810,600 | Gierman | June 16, 1931 |
| 2,455,905 | Ronning et al. | Dec. 7, 1948 |
| 2,455,906 | Ronning et al. | Dec. 7, 1948 |
| 2,505,576 | Reitan | Apr. 25, 1950 |
| 2,527,887 | Martin | Oct. 31, 1950 |
| 2,615,295 | Sishc | Oct. 28, 1952 |
| 2,664,292 | Oberholtz et al. | July 7, 1953 |
| 2,696,706 | Getsinger | Dec. 14, 1954 |
| 2,716,856 | Burns | Sept. 6, 1955 |
| 2,719,399 | Hammel | Oct. 4, 1955 |
| 2,738,638 | Pool et al. | Mar. 20, 1956 |

FOREIGN PATENTS

| | | |
|---|---|---|
| 501,664 | Great Britain | Mar. 3, 1939 |